(12) United States Patent
Tenmyo

(10) Patent No.: US 7,254,323 B2
(45) Date of Patent: Aug. 7, 2007

(54) ILLUMINATION OPTICAL SYSTEM, ILLUMINATION DEVICE AND IMAGE-TAKING APPARATUS

(75) Inventor: Yoshiharu Tenmyo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 291 days.

(21) Appl. No.: 11/035,977

(22) Filed: Jan. 18, 2005

(65) Prior Publication Data

US 2005/0162744 A1    Jul. 28, 2005

(30) Foreign Application Priority Data

Jan. 23, 2004   (JP)   ............... 2004-016374

(51) Int. Cl.
*G03B 15/06* (2006.01)
(52) U.S. Cl. .................. 396/200; 362/16
(58) Field of Classification Search ............... 396/176, 396/199, 200; 362/3, 16; 348/370, 371
See application file for complete search history.

(56) References Cited

U.S. PATENT DOCUMENTS

| 4,081,667 | A | * | 3/1978 | Lewin et al. | ............... 362/296 |
| 5,926,658 | A | | 7/1999 | Tenmyo | ............... 396/177 |
| 5,991,080 | A | * | 11/1999 | Kohta et al. | ............... 359/584 |
| 6,078,752 | A | | 6/2000 | Tenmyo | ............... 396/176 |
| 6,400,905 | B1 | | 6/2002 | Tenmyo | ............... 396/175 |
| 6,480,679 | B1 | * | 11/2002 | Ishida et al. | ............... 396/164 |
| 6,807,369 | B1 | | 10/2004 | Tenmyo | ............... 396/175 |

FOREIGN PATENT DOCUMENTS

| JP | 10-115852 | 5/1998 |
| JP | 10-241430 | 9/1998 |
| JP | 2000-250102 | 9/2000 |

OTHER PUBLICATIONS

Patent Abstract of Japan, English Abstract of Japanese Publication No. 10-241430, 1998.
Complete English Translation of Japanese Laid-Open Patent Application No. 10-241430, 1998.

* cited by examiner

*Primary Examiner*—W. B. Perkey
*Assistant Examiner*—Rishi Suthar
(74) *Attorney, Agent, or Firm*—Fitzpatrick, Cella, Harper & Scinto

(57) ABSTRACT

An illumination optical system is disclosed, which leads a luminous flux forward effectively, which emitted backward from a light source. The illumination optical system comprises a light source, and a first optical member arranged on an opposite side of a light irradiation side with respect to the light source. The first optical member includes a refractive surface through which light from the light source is transmitted and a reflective surface which reflects the light from the refractive surface toward the light irradiation side.

12 Claims, 14 Drawing Sheets

ILLUMINATION OPTICAL SYSTEM, ILLUMINATION DEVICE AND IMAGE-TAKING APPARATUS

BACKGROUND OF THE INVENTION

The present invention relates to an illumination optical system used in illumination devices for image-taking apparatuses.

The conventional optical system for illumination devices uses a reflector, which converges a luminous flux that emitted backward from a light source. Moreover, there is an optical system that the improvement of efficiency and the miniaturization thereof are attempted by arranging an optical member, which formed by a transparent body, in front of the light source, and by using a total reflection action in the optical member, as shown in Japanese Patent Laid-open Application No. H10-115852 and Japanese Patent Laid-open Application No. 2000-250102.

Thus, in the conventional optical system for lighting devices, a predetermined light distribution characteristic is obtained by irradiating an irradiation plane with the emerged light from the light source via optical members such as a prism, Fresnel lens or reflector, and by optimizing the shape of the optical members.

In recent years, the miniaturization of digital cameras and portable devices equipped with this kind of illumination device is rapidly advanced; thereby it becomes necessary to miniaturize the optical system for the illumination devices. On the other hand, it is important that the optical characteristics of the illumination device are improved in a given small space, and a lot of proposals have been made for this requirement.

As mentioned above, small and efficient optical systems are proposed, in which a prism is arranged on the illumination plane side with respect to the light source; the total reflection in the prism is used. However, the reflector is still necessary for covering the rear side of the light source, and it is difficult to evade a decrease of efficiency that is caused by using the reflector.

Generally, the reflectance of high reflective materials used for a reflector is only about 80%, and moreover, there is a problem that wrinkles or abrasions are formed on a surface of the reflector when manufacturing it in accordance with the miniaturization of the reflector. Therefore, only a lower reflectance than the original reflectance of the materials can be obtained in a state in which the reflector is installed in an actual product, and this is a big problem for making the illumination optical system.

BRIEF SUMMARY OF THE INVENTION

An object of the present invention is to provide an illumination optical system that can efficiently lead a luminous flux forward, which has emitted backward from the light source, and to provide an illumination device and an image-taking apparatus with the same.

An illumination optical system as one aspect of the present invention to achieve the above-mentioned object comprises a light source; and a first optical member arranged on an opposite side (backside) of a light irradiation side with respect to the light source. The first optical member includes a refractive surface through which light from the light source is transmitted and a reflective surface, which reflects the light from the refractive surface toward the light irradiation side.

Other objects and further features of the present invention will become readily apparent from the following description of the preferred embodiments with reference to accompanying drawings.

DETAILED DESCRIPTION OF THE PREFERRED EMBODIMENTS

A description will now be given of the preferred embodiments of the present invention by referring to the accompanying drawings.

Embodiment 1

Figure 1A:
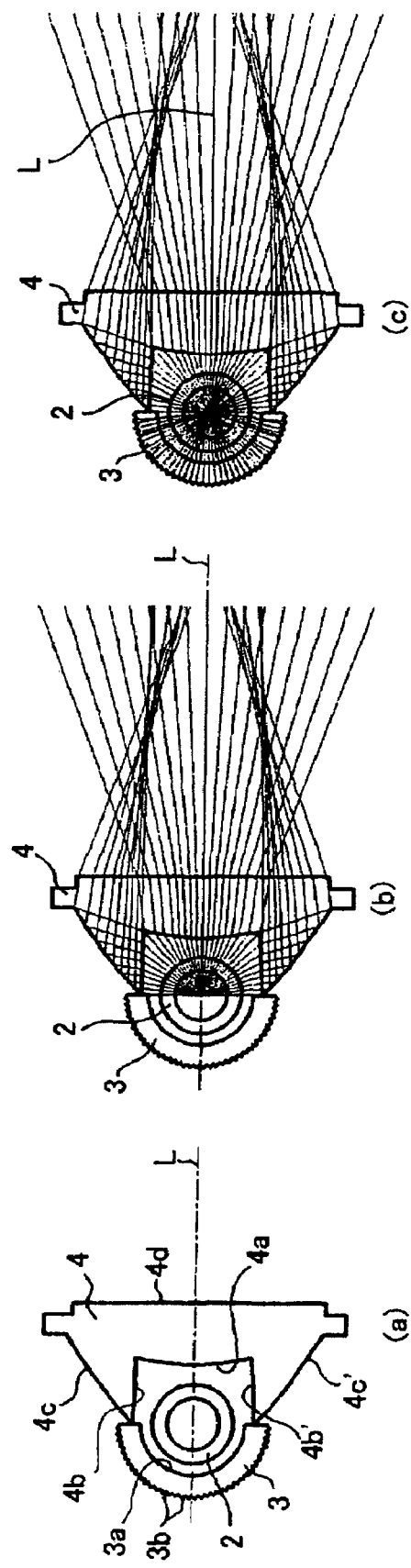
FIG. 1A is a longitudinal sectional view showing an illumination optical system in Embodiment 1 of the present invention.

FIGS. 1A to 10 show an illumination optical system in Embodiment 1 of the present invention, especially an illumination optical system that constitutes an illumination device built into a camera (image-taking apparatus). FIGS. 1A, 1B, 3, 4 and 5 show the structure of a flash optical system (illumination optical system) built into the camera. FIGS. 1A(a) to 1A(c) show the cross-section (longitudinal section) in a direction orthogonal to an optical axis of the illumination optical system. FIGS. 3(a) and 3(b) show the horizontal cross-section of the illumination optical system.

Figure 3:
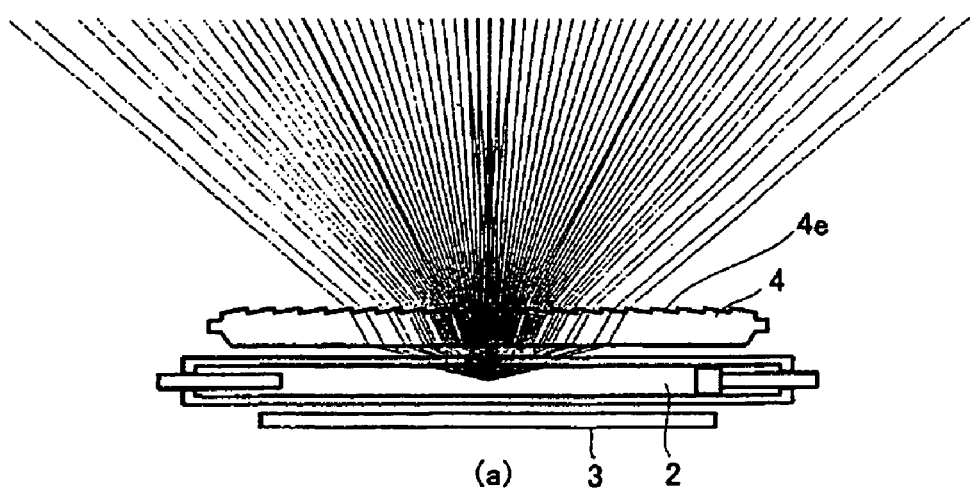
FIG. 3 is a cross sectional side view of the illumination optical system in Embodiment 1.
Figure 3:
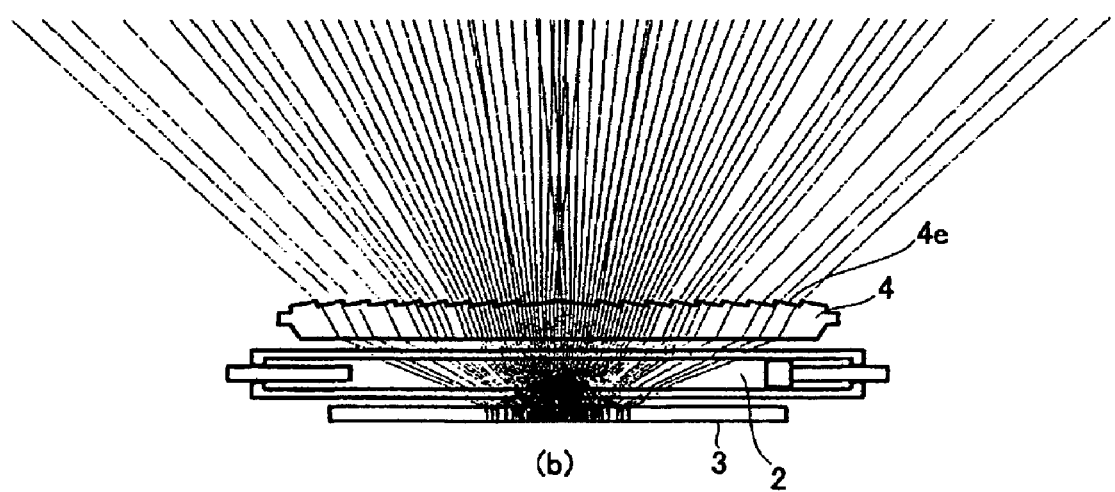
Figure 4:
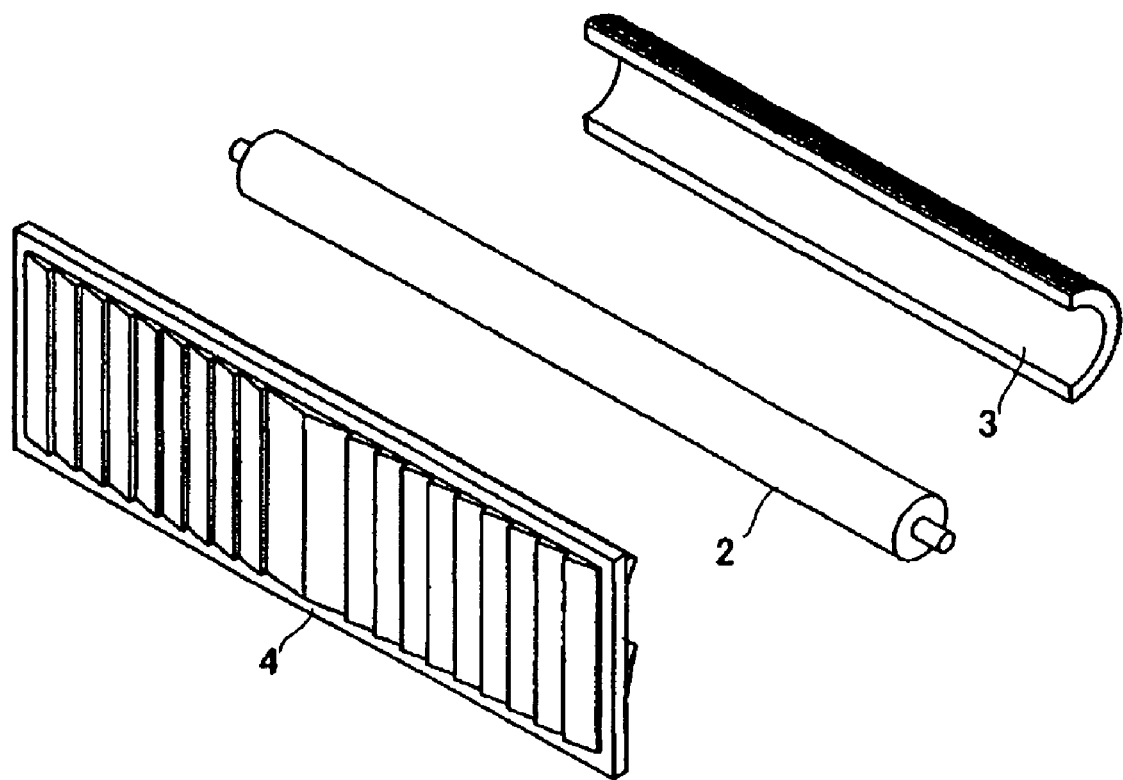
FIG. 4 is an exploded perspective view of the illumination optical system in Embodiment 1.
Figure 5:
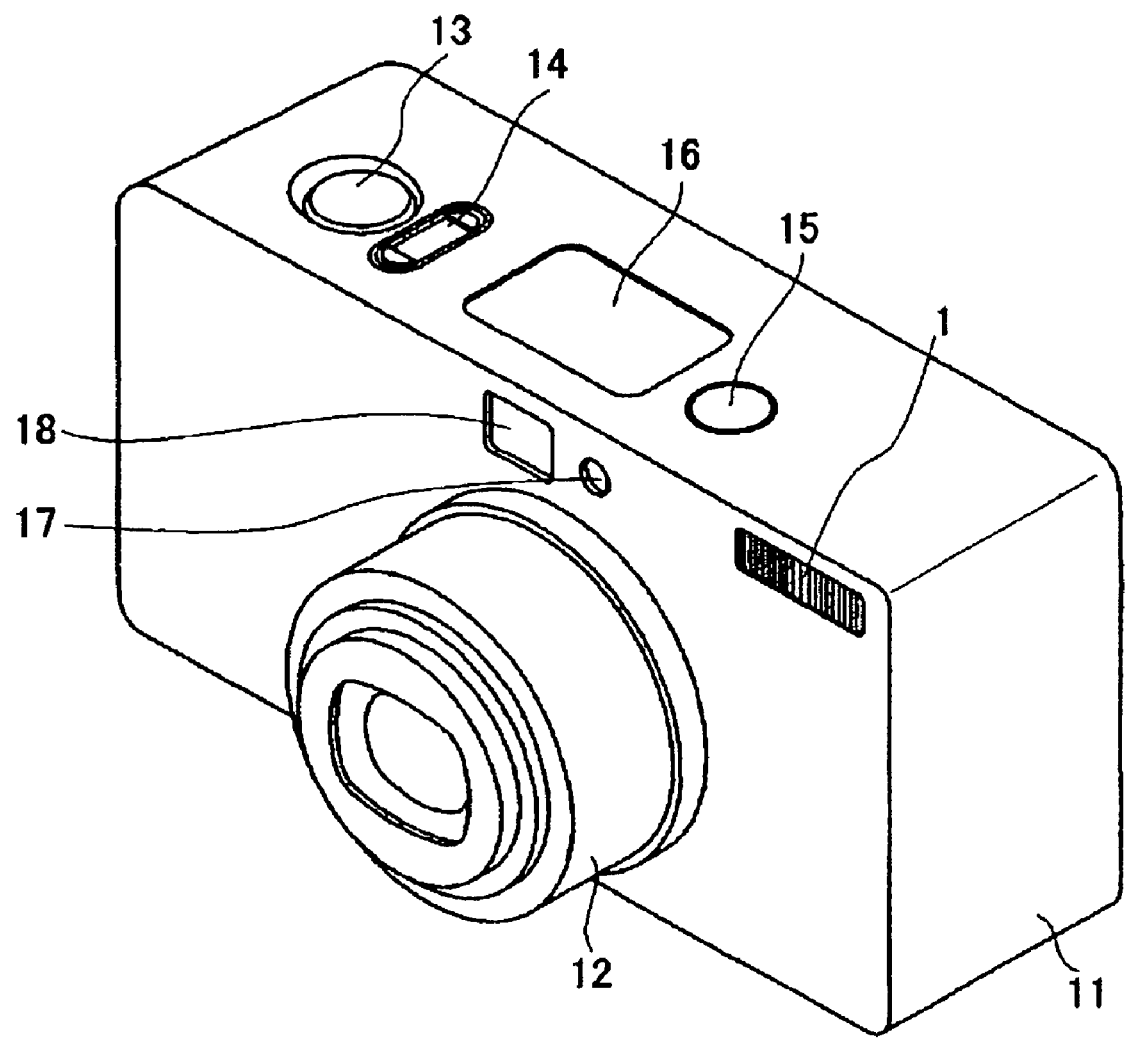
FIG. 5 is an oblique perspective view showing a camera equipped with the illumination optical system in Embodiment 1.

FIGS. 1A(a) to 1A(c) and FIGS. 3(a) and 3(b) show a ray tracing chart of the representative ray emitted from the center of a light source. FIG. 4 shows an exploded perspective view of the illumination optical system. Moreover, FIG. 5 shows a camera equipped with the illumination optical system.

First, a so-called compact camera, in which the illumination optical system of this embodiment is built, will be explained by using FIG. 5.

In this figure, the reference numeral 11 denotes a camera main body, and the reference numeral 12 denotes an image-taking lens barrel provided at approximately center of a front surface of the camera main body 1. Moreover, the reference numeral 1 denotes an illumination unit (illumination device) arranged at the right upper part when the camera main body 11 is viewed from its front.

The reference numeral 13 denotes a release button provided on the camera main body 11 for performing a photo-electric conversion image-taking of an object by an image pickup element 19 such as a CCD sensor or a CMOS sensor (or an image-taking by a film). The reference numeral 14 denotes a zoom switch for performing a zoom operation of the image-taking lens barrel 12. It is possible to zoom in a telephoto direction when pushing it forward, and to zoom in a wide-angle direction when pushing it backward.

The reference numeral 15 denotes an operating button for switching various modes of the camera, and the reference numeral 16 denotes a liquid crystal display panel for informing operations of the camera to a user. Moreover, the reference numeral 17 denotes a photometry window of a photometry unit that measures a luminance of the object, and the reference numeral 18 denotes a finder window. The illumination optical system of the present invention is also available for image-taking apparatuses such as single-lens reflex cameras or video cameras and external-type illumination devices other than the compact camera shown in FIG. 5.

Next, the description of structural elements to determine the optical characteristics of the illumination optical system in this embodiment will be given by using FIGS. 1A, 2 and 4.

In these figures, the reference numeral 2 denotes a light emitting discharge tube (xenon tube) as a gas discharge tube having a cylindrical straight tube shape. The reference numeral 3 denotes a first optical member (rear total reflection member), which reflects light components that have progressed toward an opposite side of a light irradiation side (backward in a direction of an irradiation optical axis L) and a vertical direction among a luminous flux from the light emitting discharge tube 2 forward (to a light irradiation side).

An internal surface (discharge tube side surface) of the first optical member 3 is a refractive surface (incident and emergent surface) 3a having a semi-cylindrical shape concentric with the discharge tube 2, and an external surface is a reflective surface in which a plurality of minute prism portions (reflective portions) are formed on a reference surface having a semi-cylindrical shape concentric with the refractive surface 3a. The first optical member 3 is integrally formed of a transparent material (resin material with translucency) having a high refractive index, for instance, a nanocomposite material.

The reference numeral 4 denotes a second optical member (front optical member), which is arranged in front of the discharge tube 2 and formed integrally of the transparent material. A cylindrical lens surface 4a with a positive refractive power in a direction substantially orthogonal to the longitudinal direction of the discharge tube 2 is formed in the vicinity of the irradiation optical axis L an incident surface of the second optical member 4, and a pair of prism portions having refractive surfaces (incident surfaces) 4b and 4b' and reflective surfaces 4c and 4c' is formed at the upper and lower peripheral portions in the incident surface.

Organic polymer materials for optics with high transmittances such as polymethyl methacrylate (PMMA) have been used as materials of an optical member so far. This is because PMMA is a material that is lower-cost, more lightweight and easier to mold as compared with glasses and ceramics.

However, in this embodiment, to attempt more miniaturization and improvement of the optical characteristics, a nanocomposite material in which inorganic ultra-fine particles of nano-order disperse in an organic polymer material, or a hybrid resin material in which molecules of the organic polymer material as a base material binds covalently to molecules of the inorganic ultrafine particles of nano-order.

Since, in such an organic and inorganic composite material, the inorganic particles (inorganic nano particles) having the size of 30 nm or less (one nanometer is 10 to the minus–9th power, that is, 1/1,000,000,000) disperse uniformly in the base material, the loss of optical transparency by Rayleigh scattering or the like is suppressed, and thereby high transparency can be maintained.

Moreover, since the selection width of polymeric materials used for the base material and inorganic nano particles is wide, the organic and inorganic composite material can respond to various refractive indexes and can respond to various forming processability.

Furthermore, the organic and inorganic composite material has superior characteristics in which the refractive index can be changed freely by changing an additional concentration of the inorganic nano particles even if the same materials are combined, and the entire refractive index can be controlled by attaching and applying it to various materials whose refractive indexes differ.

Niobium oxide ($Nb_2O_5$) and titanium oxide (TiO) are materials for typical inorganic nano particles. Since the refractive index of a simple nano particle is high with 2.3, if the refractive index of an organic material used as the base material is low with about 1.5, a great increase of the refractive index can be expected.

As the above-mentioned explanation, the a nanocomposite material and the hybrid material of inorganic nano particles and an optical resin have superior characteristics (transparency, thermal resistance, mechanical strength, surface hardness, moldability, etc.), which do not exist in the conventional arts. In this embodiment, the significant miniaturization and the improvement in performance of the illumination optical system are realized using these characteristics.

In addition, although the content of the inorganic nano particles to the base material can be chosen accordingly, the above-mentioned effects appear notably at 20-30% by weight or more, and the above-mentioned effects can be also acquired at 50% by weight or more while maintaining the required transparency.

Especially, it is easy to increase the content of the ultrafine particles in the present invention while maintaining the required transparency because the particle size (average particle size) is extremely small; the particle size is equal to or less than 1 μm. In other words, it is easy to increase the refractive index. Moreover, the possibility that an optical material having both high transparency and high refractive index can be achieved is high because the progress of the illuminating light is not obstructed (diffusion is hardly caused) in a case where the particle size is equal to or less than the wavelength of the visible light (400 to 700 nm), especially, the particle size is equal to or less than 100 nm, which is enough smaller than the wavelength of the visible light.

The advantages when this material is used for the optical system in this embodiment are enumerated as follows.

1. The shape of the optical member can be simplified because the refractive index the material can be increased more than conventional resin materials. In other wards, it is possible to miniaturize the entire shape of the optical member since the thickness of the optical member for forming an equivalent converging optical system can be thinned, and it is possible to obtain a configuration that can be fabricated easily. Moreover, when the same effect of refraction is given, the curvature of lens surfaces can be set gently and the loss of light amount at the time of the incidence on and emergent from the optical member by surface reflections can be suppressed to the minimum.

2. The optical member can be arranged at a position close to the light source because a heatproof temperature thereof is higher than the simple base material. As a result, the entire shape of the optical member can be further miniaturized.

3. The liquidity of the material is higher than the simple base material, and the material can respond to minute shapes of the optical member. Moreover, the degree of freedom in design increases.

4. Coloring is easy and the optical loss is little. The loss of light amount can be suppressed by the color correction of the pigment system.

As the above-mentioned explanation, in this embodiment, using the above-mentioned material can draw out a lot of convenient characteristics in optics.

In above-mentioned camera, in a case where the camera operation mode is set to, for instance, "flash auto mode", a central processing unit, not shown in the figure, judges whether the illumination unit is made to emit the illuminating light or not based on the luminance of the object measured by the photometry unit, not shown in the figure, and the sensitivity of the image pickup element 19 such as a CCD sensor or a CMOS sensor (or a film) in accordance with the push of the release button 13 by the user.

When the central processing unit judges "The illumination unit is made to emit the illuminating light" under an image-taking situation, the central processing unit outputs a light emitting signal, and makes the discharge tube 2 emit the illuminating light via a light emitting control circuit and a trigger lead line, not shown in figure. In a conventional structure that uses a reflector, the discharge tube has been made to emit light via the trigger lead line installed on the reflector. However, since no reflector is provided in this embodiment, the trigger lead line is installed directly (or without the reflector) on the discharge tube 2.

The luminous flux emitted backward in the direction of the irradiation optical axis L and vertical direction among the emitted luminous flux from the discharge tube 2 enters the first optical member 3 from its refractive surface 3a, and is again transmitted through the refractive surface 3a via two total reflections at two reflective surfaces (prism surfaces) that constitutes the prism portion 3b to return to the discharge tube 2.

Figure 2:
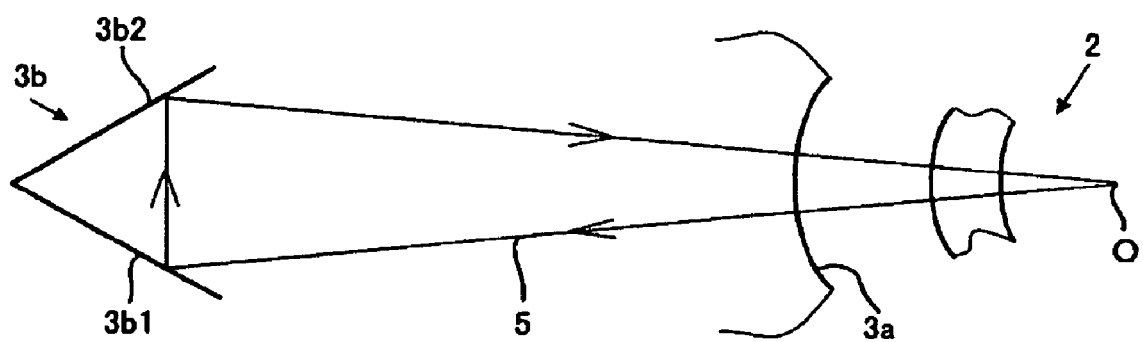
FIG. 2 is a pattern diagram showing an action of a prism portion in an optical member that constitutes the illumination optical system in Embodiment 1.

In more details, as shown in FIG. 2, a ray 5 emitted from the center O of the discharge tube 2 is transmitted through the refractive surface 3a of the first optical member 3, is totally reflected at a first prism surface 3b1 which constitutes the prism portion 3b, progresses to a second prism surface 3b2, is then totally reflected at the second prism surface 3b2, and returns to the approximate center O of the discharge tube 2 through the refractive surface 3a.

Moreover, the luminous flux emitted forward in the direction of the irradiation optical axis L enters directly the second optical member 4 to be converted into a luminous flux having a predetermined light distribution characteristic, and is then irradiated to an object side (irradiation plane side).

Next, the optimal setting method of the illumination optical system in this embodiment, which is smaller than the conventional one, and can irradiate the illuminating light uniformly and efficiently within the required irradiation range will be explained by using FIGS. 1A to 3.

Figure 1B:
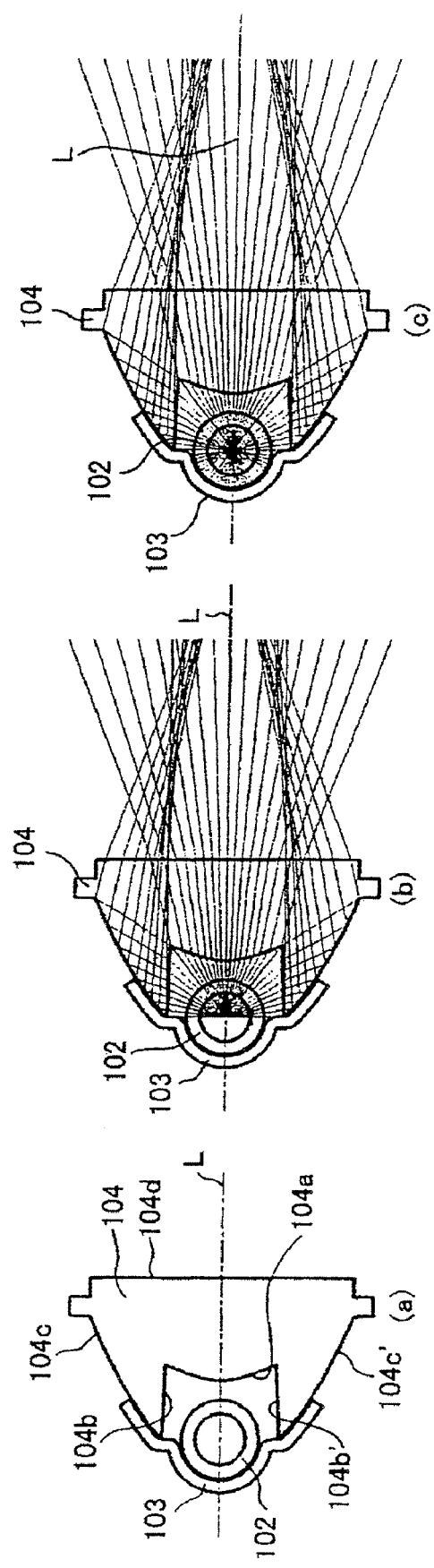
FIG. 1B is a longitudinal sectional view showing a conventional illumination optical system.

FIGS. 1A(a) to 1A(c) show the longitudinal section of the illumination optical system in a direction of the discharge tube's diameter in the present embodiment, and show a basic idea for optimizing the light distribution characteristic in the vertical direction. FIG. 1B is a figure for the comparison, and shows the longitudinal section of the illumination optical system with a reflector that consists of a metallic reflector, instead of the first optical member 3 formed of a resin material.

In addition, FIGS. 1A(a) to 1A(c) and FIGS. 1B(a) to 1B(c) show the shape in the same section, and (b) and (c) of each figure are figures added ray trace charts on (a). The ray trace charts show a luminous flux that progresses to the second optical member directly, and a luminous flux that progresses to the second optical member after the total reflection at the first optical member.

In these figures, the internal and external diameters of the glass tubes of the discharge tubes 2 and 102 are shown. As an actual light-emitting phenomenon of the discharge tube in this kind of illumination optical system, it is usual to make the discharge tube emit light from the whole area of the internal diameter thereof for improving its efficiency. Therefore, it can be thought that light is emitted substantially uniformly from light-emitting points that exist in the whole area of the internal diameter of the discharge tube. However, to facilitate the explanation, a luminous flux emitted from the discharge tube, that is, the center of the light source is defined as a representative luminous flux, and only the representative luminous flux is shown in the figures.

The actual light distribution characteristic changes so as to widen slightly as a whole by a luminous flux emitted from the peripheral portion of the discharge tube in addition to the representative luminous flux emitted from the center of the light source shown in the figure. However, since the tendencies of the light distribution characteristic are almost matched, the explanation will be given by using this representative luminous flux as follows.

At first, as shown in FIGS. 1A(a) to 1A(c), the inside surface of the first optical member 3 is constituted by the refractive surface (incident surface) 3a having a semi-cylindrical shape substantially concentric with the discharge tube 2 and the prism portion (reflective portions) 3b formed on a surface (reflective surface) opposed to the refractive surface 3a at the external side. This is the shape effective for the total reflection of the rays from the center of the light source at the constituent surfaces of the prism portion 3b to return the rays to the vicinity of the center of the light source again. Furthermore, the shape is effective for reducing the influence by refraction of the glass portion of the discharge tube 2.

Moreover, the light totally reflected by the first optical member 3 can be treated as light that is almost equivalent to the directly emitted light from the light source, and it becomes possible to miniaturize the whole optical system that continues after the first optical member 3.

The reason why the shape of the first optical member 3 is just a semi-cylindrical shape is as follows. If the shape is smaller than it, the second optical member 4 grows in size for converging the luminous flux directing vertically, and, on the contrary, if the shape is larger than it, the luminous flux that stays in the first optical member 3 increases, and the efficiency decreases.

Next, the shape of the second optical member 4 that has the most influence to the light distribution characteristic of the illumination optical system will be explained. To obtain a uniform light distribution in the required irradiation range by a small illumination optical system, the following structure is adopted in the present embodiment.

At First, a portion in the vicinity of the irradiation optical axis L on the incidence surface side of the second optical member 4 is formed as a cylindrical lens surface 4a, as shown in FIG. 1A(a), which has a positive refractive power in the plane orthogonal to the irradiation optical axis L. Therefore, a luminous flux progressing in the vicinity of the irradiation optical axis L among the luminous flux emitted from the discharge tube 2 is converted into a luminous flux with a uniform light distribution for the predetermined irradiation angle range, and then emerges from an emergent surface 4d of the second optical member 4.

Here, to give a uniform light distribution characteristic, the shape of the cylindrical lens surface 4a of the second optical member 4 is set to a continuous aspheric surface shape so that a proportional relation may be formed between an emitting angle from the center of the discharge tube 2 and an emergent angle after transmitting through the second optical member 4, and may converge the light at a constant rate. This state can be understood from the appearance in the vicinity of the irradiation optical axis L in the ray trace chart shown in FIG. 1A(c).

Next, upper and lower luminous flux components whose emitting angles with respect to the irradiation optical axis L are large, which are incident directly on refractive surfaces (incident surfaces) 4b and 4b' in upper and lower peripheral portions of the second optical member 4, among the luminous flux emitted from the center of the discharge tube 2 will be explained.

The luminous flux components directing to the upper and lower peripheral portions enter the second optical member 4 from the refractive surfaces (incident surfaces) 4b and 4b', and then are reflected at the reflective surfaces 4c and 4c'. The shapes of the reflective surfaces 4c and 4c' are set so that a uniform light distribution that has an almost similar irradiation angle range to the above-mentioned incident luminous flux on the cylindrical lens surface 4a may be obtained by the upper and lower luminous flux components that were reflected thereon and overlapped.

This state is as shown in the ray trace chart of FIGS. 1A(b) and 1A(c). Thus, the uniform light distribution can be obtained as shown in FIG. 1A(b) as a whole for the required irradiation range. Moreover, the refractive surfaces 4b and 4b' and the cylindrical lens surface 4a form completely separated optical paths, and thereby they can perform light converging (irradiating) control independently.

Although the explanation about the luminous flux which enters the second optical member 4 directly among the luminous flux emitted from the discharge tube 2 as the light source was given, the luminous flux emitted backward from the discharge tube 2 also returns to the discharge tube 2 via the first optical member 3, traces an almost similar optical path as shown in FIG. 1A(c), and is emerged toward the irradiation plane side.

In other words, the luminous flux emitted from the center of the discharge tube 2 returns to the center of the discharge tube 2 after the total reflection at the prism portion 3b of the first optical member 3 again because the shape of the first optical member 3 is concentric with the center of the light source. After that, the luminous flux is converted into a luminous flux having the required irradiation angle by the action of the second optical member 4, and irradiated to the irradiation plane, as well as the above-mentioned explanation. This state is shown in FIG. 1A(c).

Next, the effects obtained by using the nanocomposite material will be explained in the present embodiment by the comparison with FIGS. 1B(a) to 1B(c). The optical member 104, which is used for a conventional optical system including a reflector 103 shown in FIGS. 1B(a) to 1B(c), has an optimal shape in a case where polymethyl methacrylate (PMMA: the refractive index is 1.492) is used, which is frequently used for normal flash optical systems. The converging effect of the entire optical system is almost similar to the optical system in this embodiment.

As understood by the comparison of both figures, it is possible to miniaturize the second optical member 4 by using the nanocomposite as an optical material. To compare the sizes of the optical systems, the positional relations between the discharge tubes 2 and 102 as the light sources and the incident surfaces of the second optical members 4 and 104 are assumed to be the same conditions.

The largest difference point between the optical system in the present embodiment (FIG. 1A) and the conventional optical system (FIG. 1B) is a point that a reflection member arranged behind the discharge tube is an optical member (the first optical member 3) having translucency and a total reflection action in this embodiment, and is a metallic reflector of high reflectance such as a brilliance aluminum or the like in the conventional optical system.

As understood from the ray trace charts shown in FIG. 1A(c) of the present embodiment and FIG. 1B(c) of the conventional embodiment, the luminous flux emitted from the center of the light source progresses to the irradiation plane with almost similar behaviors in both embodiment. The luminous flux emitted in a direction opposite to the original direction of irradiation among the luminous flux emitted from the center of the light source is reflected at each back surface, then returns to the center of the light source again by returning on the optical path that have passed first, and is irradiated as an illuminating luminous flux with a uniform light distribution characteristic through the similar optical path to the optical path shown in FIGS. 1A(b) and 1B(b) (the optical path of the luminous flux emitted from the center of the light source to the irradiation direction originally).

Thus, the optical system in the present embodiment and the optical system in the conventional embodiment can be made as optical systems with similar optical actions for the luminous flux from the vicinity of the center of the light source. Especially, for the light source whose outer part is constituted by a transparent member as a light-emitting discharge tube, the above-mentioned optical path can be used enough for increasing intensity of light because the light source is basically transparent itself.

Moreover, since the above-mentioned optical path is not received adverse influences of refraction of the glass portion, and further the minimum illumination optical system that can be thought can be composed, the above-mentioned optical path can be called the optimal optical path as an optical path for using the luminous flux toward behind the light source again. However, in a case where the luminous flux returns to the center of the light source in a discharge tube like a fluorescent tube, the illumination optical system doesn't become a preferable illumination optical system since the efficiency deteriorates extremely.

Thus, in the present embodiment, in the direction substantially orthogonal to the longitudinal direction of the discharge tube 2, all the luminous fluxes emitted from the center of the discharge tube 2 are converted into luminous fluxes with a uniform light distribution, respectively, by the optical action of the cylindrical lens surface 4a and the prism portion constituted by the refraction surfaces 4b and 4b' and the reflective surfaces 4c and 4c', shown in FIG. 1A. And, a uniform light distribution characteristic as a whole can be obtained efficiently by making the light distributions overlap.

Moreover, the further miniaturization of the whole shape of the optical system can be achieved than ever. Furthermore, since the curved surface of each optical member can be formed gently, it is possible to not only improve the formability but also to suppress a decrease of light amount to the minimum when the light is transmitted through the resin material. In addition, it contributes to lightening an image-taking apparatus and other optical apparatuses equipped with this illumination optical system.

Although it was described that the effect equivalent to the conventional reflector can be given to the first optical member 3 in the above-mentioned explanation, an optimal illumination optical system cannot be necessarily obtained even if the optical resin material that has been used conventionally as an optical material is used in the present invention.

In other words, although the equivalent optical system can be formed if the light source can be treated as a point light source or an effective light-emitting portion of the light source is very thin as compared with the optical system, since the size of the light source is considerably large with respect to the entire optical system in an actual illumination optical system, an optimal illumination optical system cannot be necessarily obtained without ingenuities of the shape or material of the first optical member 3.

The most optimal conditions of the light source and the optimal shape of the first optical member 3 for the present optical system will be explained as follows by using FIGS. 6 to 10.

Figure 6:
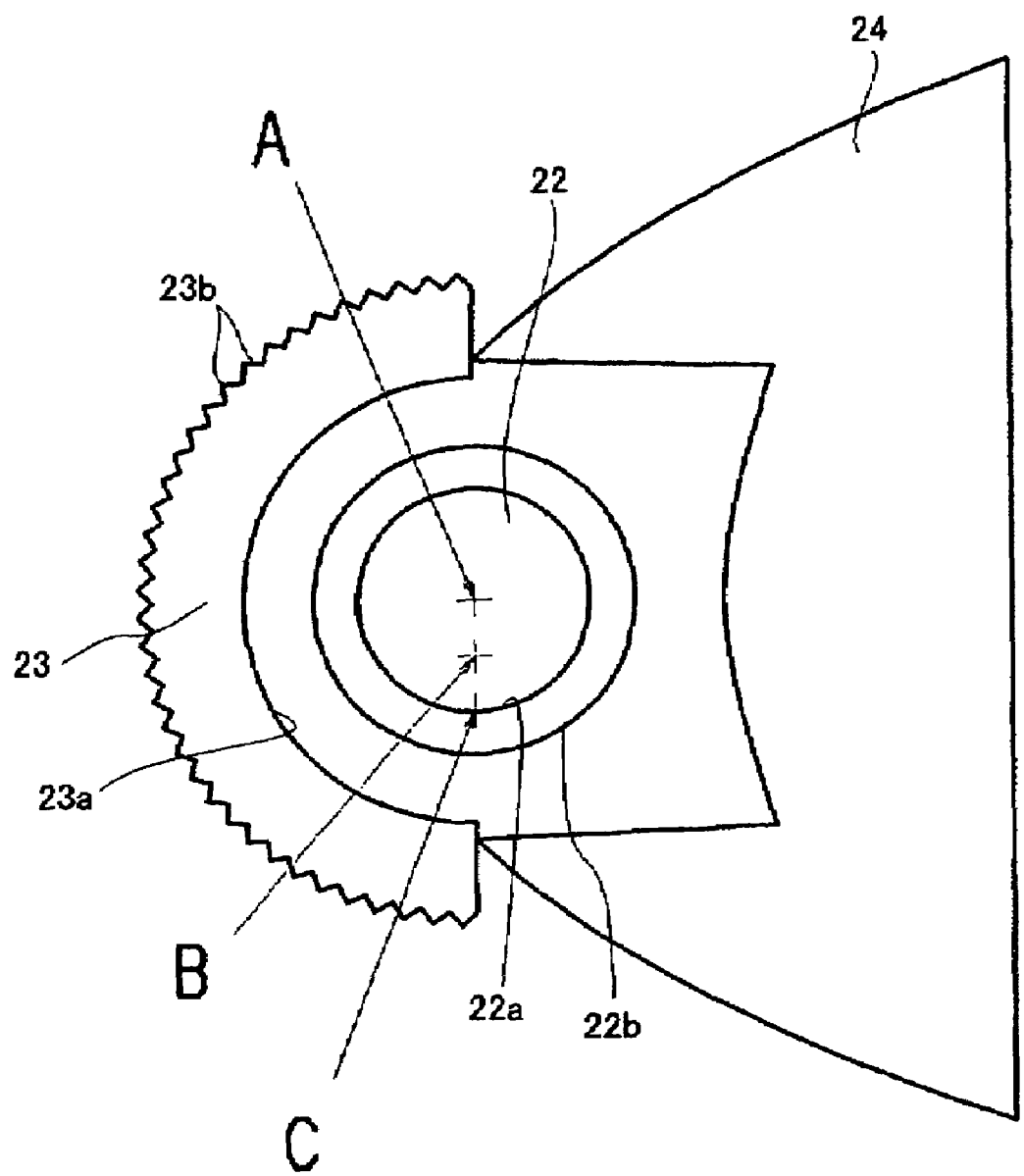
FIG. 6 is a figure for explaining influences of the refractive index of the optical member in Embodiment 1.
Figure 7:
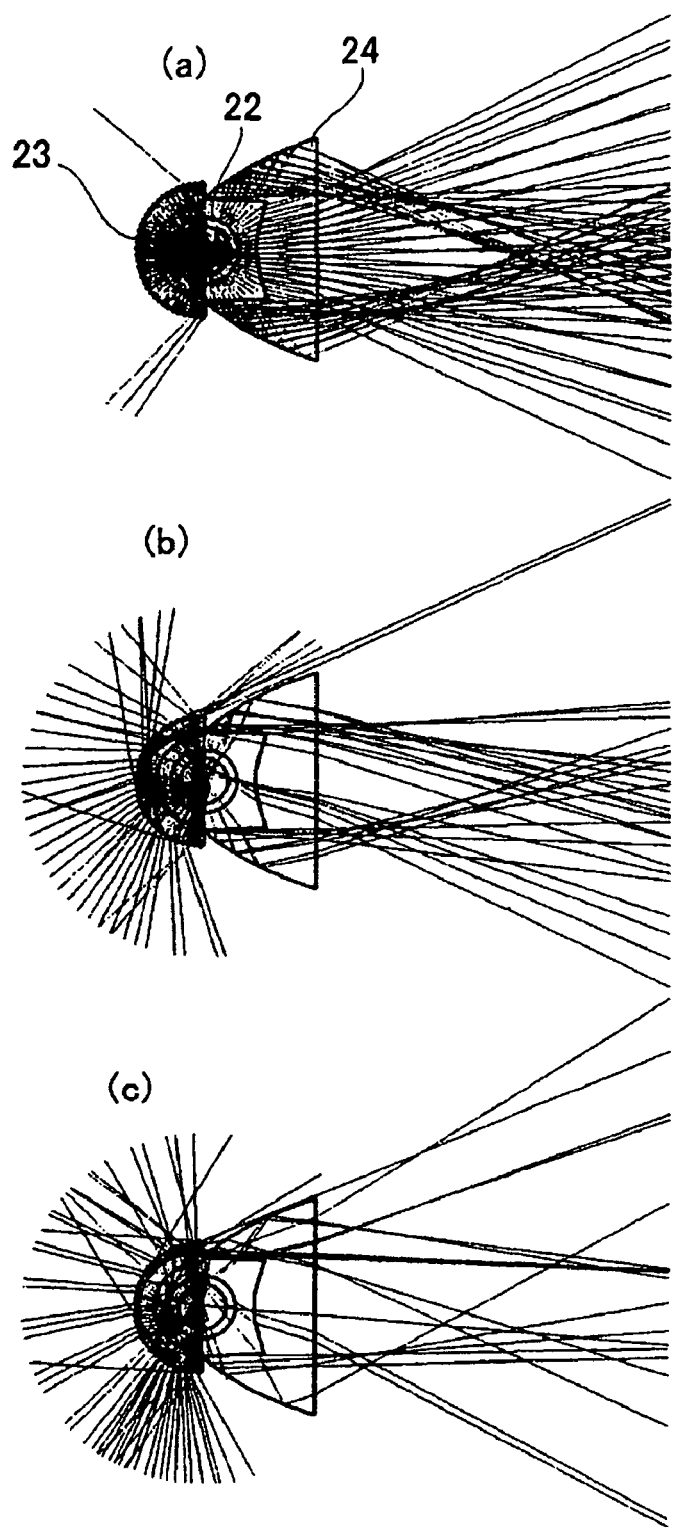
FIG. 7 is an explanation chart in a case where the optical member consists of a low refractive index material in Embodiment 1.
Figure 8:
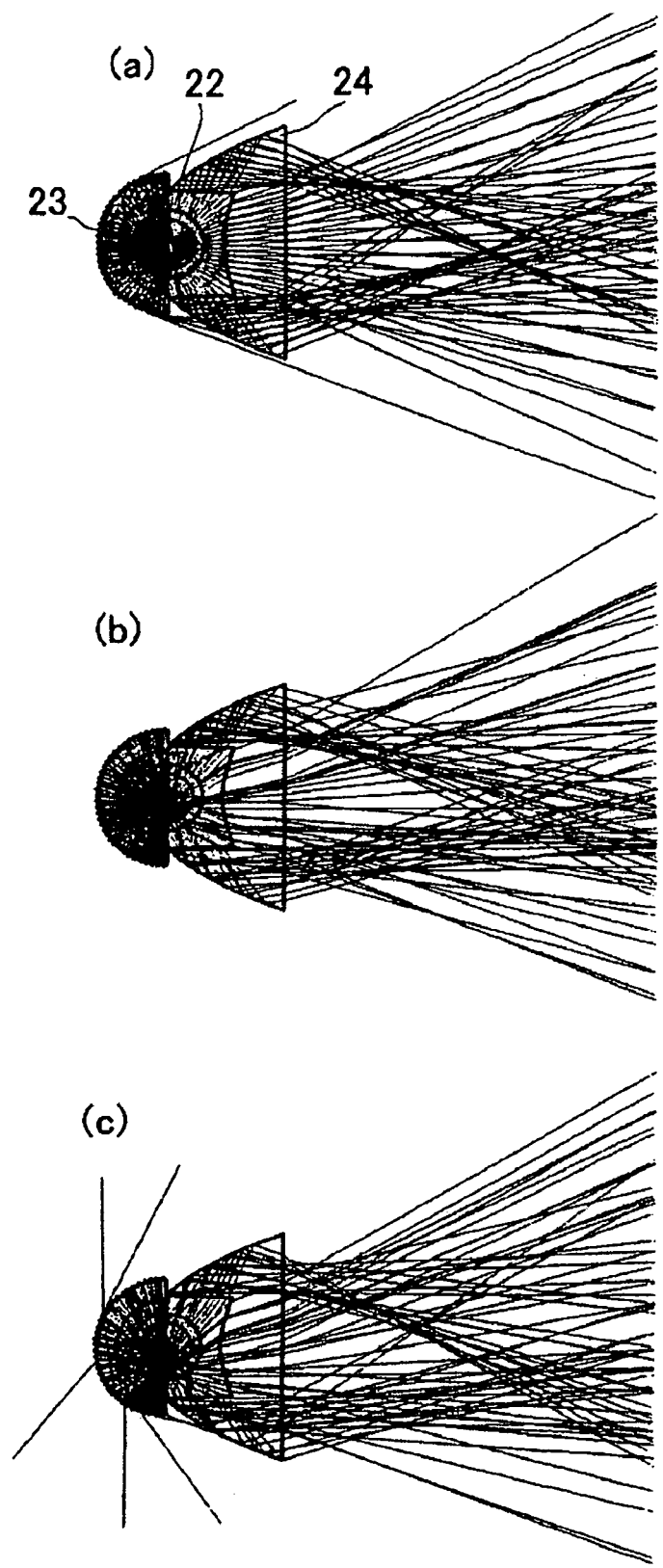
FIG. 8 is an explanation chart in a case where the optical member consists of a high refractive index material in Embodiment 1.

FIGS. 6 to 8 are charts for explaining the change of the ray trace chart when the size of the light source is considerably large with respect to the entire optical system, and the effects when the refractive index of the optical material is changed.

In FIG. 6, the reference numeral 22 denotes a light-emitting discharge tube having a cylindrical shape. The reference numeral 22a denotes an internal surface of a glass tube of the discharge tube 22, and the reference numeral 22b denotes an external surface of the glass tube.

The reference numeral 23 denotes a first optical member. A refractive surface (internal surface) 23a of the first optical member 23, which is a discharge tube side surface, is formed so as to have a semi-cylindrical shape substantially concentric with the center of the cylindrical shape of the discharge tube 22, and the external surface 23b of the first optical member 23 is a reflective surface in which a plurality of prism portions 23b are formed on a reference surface having a semi-cylindrical shape concentric with the refractive surface 23a. The prism portions 23b have a role to return a luminous flux that emitted from the discharge tube 22 and was transmitted through the refractive surface 23a, to the vicinity of the center of the discharge tube 22.

It is possible to decrease an incident angle of the incident light to the refractive surface 23a of the first optical member 23 by giving a semi-cylindrical shape concentric with the discharge tube 22 to the refractive surface 23a, which is the incident surface, and by arranging the refractive surface 23a close to the discharge tube 22. Therefore, the optical system in which the loss of light amount by surface reflections is small and the efficiency is good can be achieved.

Moreover, the vertex angle of each prism portion 23b is set to almost 90 degrees. Since it becomes possible to return the luminous flux that emitted from the center of the light source to the center of the light source more accurately with narrowing the pitch interval of the prism portions 23b when the vertex angle of each prism portion 23b is set to 90 degrees. This is preferable. However, when the pitch interval is narrowed too much, the shape accuracy of each prism portion 23b deteriorates to round the prism portion 23b, depending on molding conditions of the resin material. Thereby, an accurate control of the luminous flux cannot be performed, and it becomes extremely expensive to form the first optical member 23 with accurate shapes. This is inconvenient.

In the first optical member 23 shown in FIG. 6, this pitch interval is set to 5 degrees. Moreover, it is preferable that the thickness of the first optical member 23 is thin as much as possible for miniaturizing the whole shape, and also from a viewpoint of returning the luminous flux to the center of the light source.

There is a possibility that a phenomenon, which affects the optical characteristics negatively, such as melting the optical material by an influence of heat, will occur when the optical member is too thin because of a lot of heat generated at the time of emitting light. Moreover, the thickness more than a certain level is necessary to maintain the shape of the first optical member 23. In addition, it is necessary to secure a certain degree of thickness to form the minute reflective surfaces that constitute the prism portion 23b.

From these reasons, the relation between the air distance from the external surface of the discharge tube 22 to the refractive surface 23a of the first optical member 23 and the thickness of the first optical member 23 is necessary to meet a certain condition.

At first, it is preferable that the air distance from the external surface of the discharge tube 22 to the refractive surface 23a of the first optical member 23 is set to 0.2 mm or more as the minimum air distance that the optical resin material is not influenced by heat.

Moreover, it is preferable that the thickness of the first optical member 23 is set to 0.3 mm or more for maintaining the optical shape, improving the formability of the prism portions 23b and decreasing the influence of the heat from the light source.

Furthermore, in FIG. 6, the reference numeral 24 denotes a second optical member. The function of the second optical member 24 is similar to the above-mentioned second optical member 4. It is preferable to form the second optical member 24 of an optical material with a high refractive index.

FIGS. 7(a) to 7(c) and FIGS. 8(a) to 8(c) show what optical paths the luminous fluxes emitted from representative points A, B and C are traced on. The point A is the center point of the light-emitting discharge tube 22, which is constituted as above, in the optical system shown in FIG. 6, and the point C is the nearest point to the glass tube in the internal diameter range. Furthermore, the point B is an approximately middle point between the points A and C.

Only the refractive index of the first optical member 23 is different between the optical system shown in FIG. 7 and the optical system shown in FIG. 8, and other conditions are exactly the same. Moreover, FIG. 7 shows the ray trace chart when the refractive index of the first optical member 23 is set to 1.5, and FIG. 8 shows the ray trace chart when the refractive index of the first optical member 23 is set to 2.0. In addition, each figure's (a) shows rays emitted from the point A of the discharge tube 22, and each figure's (c) shows rays emitted from the point C. Furthermore, each figure's (b) shows rays emitted from the point B.

As understood from these figures, both the luminous fluxes emitted from the point A have the similar light distribution and light intensity, and are converted into the luminous fluxes that trace an optical path approximately similar to an optical path in the case where the conventional reflector is used. Advantages of the optical system in the present embodiment in comparison with the case using the reflector, includes an improvement of the reflectance of the first optical member 23 by using the total reflection action thereof.

Thus, in a case where the illumination optical system is applied to a light source that a luminous flux emitted from the center of the light source is comparatively large, for instance, a light source with a thin internal diameter, an extremely efficient illumination optical system can be achieved.

On the other hand, an influence of the refractive index of the first optical member 23 is large for the luminous flux emitted from a position away from the center of the light source. As compared with each figure's (b) concerning the luminous flux from the point B away from the center of the light source in some degree, about a half of the luminous flux from the point B emerges (exit) backward from the first optical member 23 whose refractive index is low, as shown in FIG. 7(b).

On the contrary, in the optical system including the first optical member 23 whose refractive index is high, the luminous flux emerging backward from the first optical member 23 is not seen, as shown in FIG. 8(b), and a ray trace chart that is almost equivalent to that of the conventional reflector can be drawn.

Next, as compared with each figure's (c) concerning the luminous fluxes emitted from the point C most away from the center of the light source, most of all the luminous flux emerge backward from the first optical member 23 when using an optical material with a low refractive index (FIG. 7(c)), and the loss of light amount is very large. On the other hand, the luminous flux emerging backward from the first optical member 23 is extremely little when using an optical material with a high refractive index (FIG. 8(c)), and it is possible to form an illumination optical system that is almost equivalent to an optical system with a reflector.

Thus, the internal diameter of the discharge tube 22 and the refractive index of the first optical member 23 are weighty elements for deciding the optical characteristics in the present embodiment. And, it is important to thin the internal diameter of the discharge tube 22 as much as possible, and to raise the refractive index of the first optical member 23 as much as possible.

Figure 9:
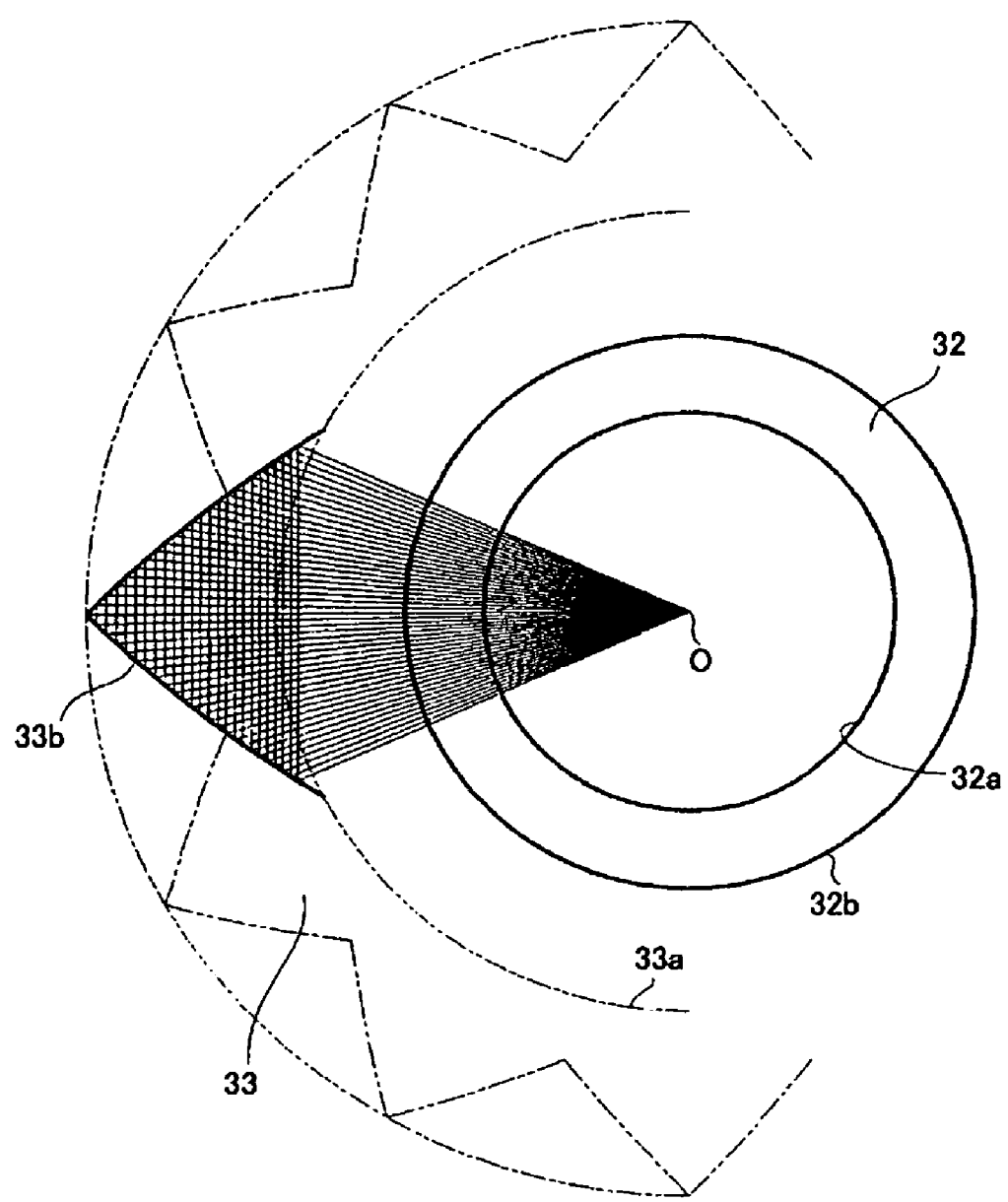
FIG. 9 is a figure for explaining an ideal shape of the optical member in Embodiment 1.
Figure 10:
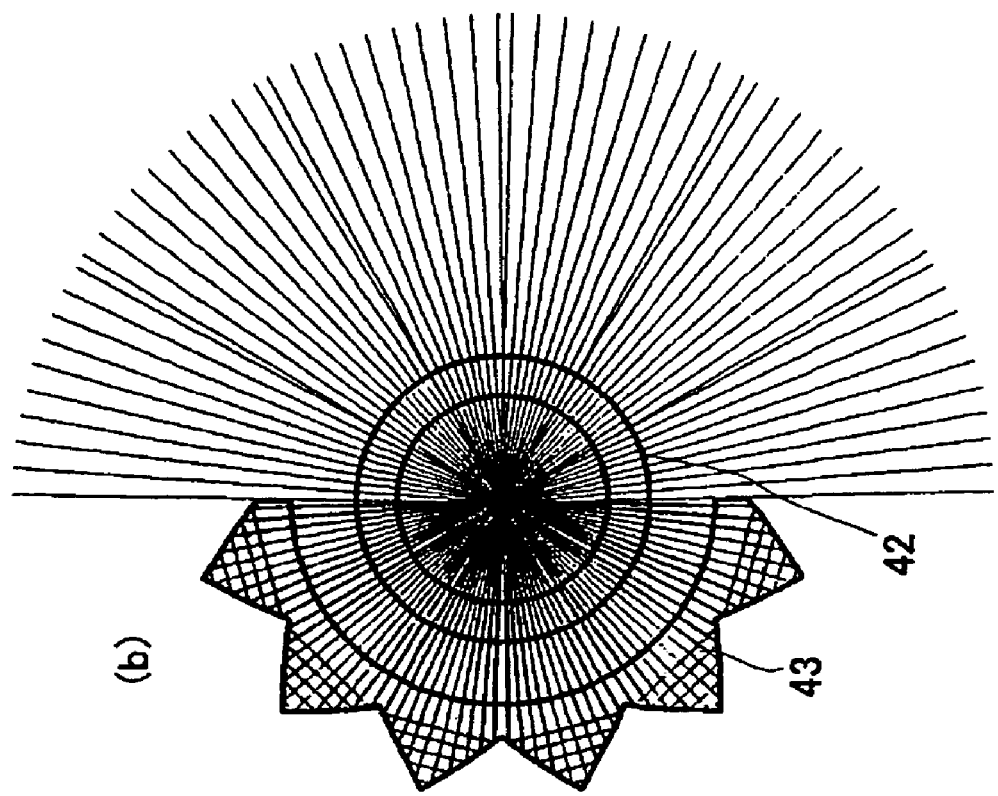
FIG. 10 is a figure for explaining an ideal shape of the optical member in Embodiment 1.
Figure 10:
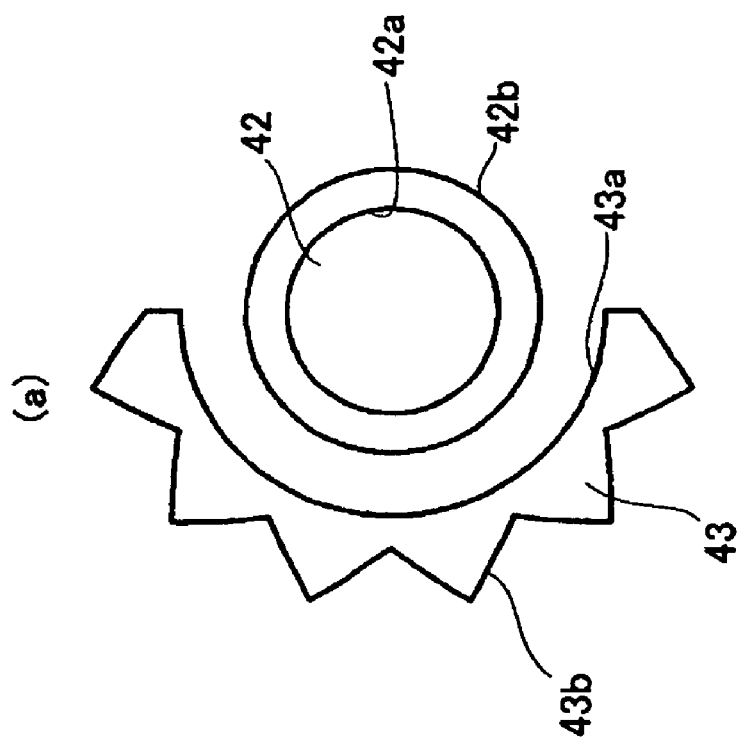

Next, the optimal shape of the prism portion of the first optical member will be explained by using FIGS. 9 and 10.

In the previous explanation, it was preferable to set the vertex angle of the prism portion in the first optical member to almost 90 degrees. However, it is not necessarily preferable to form potions other than the vertex of the prism portion so as to have the angle of 90 degrees. The explanation of an ideal shape of the prism portion will be given by using FIGS. 9 and 10 as follows. This shape is effective to give optimal optical effects while especially decreasing the number of prism portions.

The ideal shape of the prism surfaces, which are two reflective surfaces constituting each prism portion of the first optical member is a shape that can return all the luminous flux that emitted from the center of the light source to the center of the light source accurately. FIG. 9 shows the ideal shape from the viewpoint.

In these figures, the reference numeral 32 denotes a light-emitting discharge tube, the reference numeral 32a denotes the internal diameter of a glass tube in the discharge tube 32, and the reference numeral 32b denotes the external diameter of the glass tube. The reference numeral 33 denotes a first optical member, which comprises a refractive surface 33a having a semi-cylindrical shape concentric with the center of the light source, and a prism portion 33b constituted by two prism surfaces.

In the illumination optical system with this structure, the shape of the prism surface for performing a total reflection and returning the luminous flux that emitted from the center O of the light source to the center O accurately is a paraboloidal surface shape whose focal point is set to the center O of the light source, and the ideal shape of the prism portion can be obtained by combining the two paraboloidal surfaces so that the vertex angle becomes 90 degrees.

When the prism portions are formed with a fine pitch, the two prism surfaces can return the luminous flux to the vicinity of the center of the light source in some degree by combining them at the vertex angle of 90 degree, as shown in FIGS. 1A to 8. However, it is preferable that each prism portion having a shape similar to the ideal shape is formed when the number of the prism portions is decreased as shown in FIG. 9.

FIGS. 10(a) and 10(b) show a first optical member 43 in which the number of the prism portions having the above-mentioned ideal shape is decreased as much as possible. The reference numeral 42 denotes a light-emitting discharge tube, the reference numeral 42a denotes the internal diameter of a glass tube in the discharge tube 42a, and the reference numeral 42b denotes the external diameter of the glass tube.

Moreover, the first optical member 43 comprises a refractive surface 43a having a semi-cylindrical shape and prism portions 43b. Six prism portions 43b are formed with a pitch of 30 degrees in the first optical member 43.

By structuring the first optical member as above, the luminous flux can be accurately returned to the center of the light source even if the number of prism portions is decreased as shown in FIG. 10(b), and an illumination optical system that the unevenness of light distribution is little and the efficiency is extremely good can be achieved.

Next, a converging action of the illumination optical system in the longitudinal direction of the discharge tube in the present embodiment will be explained by using FIG. 3.

FIG. 3(a) shows a section when the optical system is cut by a plane including the center axis of the discharge tube 2, and also shows a ray trace chart of rays progressing toward the emergent surface directly from the center in the longitudinal direction and the center of a diameter direction of the discharge tube 2. Moreover, FIG. 3(b) shows a ray trace chart of the luminous flux that enters the first optical member 3 in the same section as FIG. 3(a). The luminous fluxes in both figures are influenced by an almost similar converging action, and irradiated uniformly to a required irradiation range.

However, the case to use an optical material with a high refractive index is assumed in the present embodiment, though there are a lot of advantages by using the optical material with such a high refractive index besides the above-mentioned advantages, there is a uncontrollable thing, too.

The uncontrollable thing is that it is difficult for the luminous flux to emerge from a surface assumed as an emergent surface of the optical member because using an optical material with a high refractive index facilitates total reflections of the luminous flux in the optical member. Therefore, it is preferable to form a Fresnel lens with a weak optical power on the emergent surface as shown in FIGS. 3(a) and 3(b) because it is difficult to form the emergent surface as a curved surface with a large curvature.

In the present embodiment, the Fresnel lens 4e with a weak optical power is formed on the emergent surface of the second optical member 4 with the point in mind. In addition, a noteworthy point is that the angle of each lens surface of the Fresnel lens 4e is set to the approximately same angle. By structuring the optical member as above, adverse influences by total reflections on the emergent surface when a material with a high refractive index is used can be suppressed to the minimum, and an efficient converging action can be obtained.

In the present embodiment, the shape of the cylindrical surface 4a in the second optical member 4 is set to a continuous aspheric shape so that a proportional relationship is formed between an emitting angle of rays from the center of the discharge tube 2 and an emergent angle from the second optical member 4. Thereby, the rays are converged at a predetermined rate.

However, the shape of the cylindrical surface 4a is not limited to an aspheric shape. A cylindrical surface with a constant curvature, which is approximated to an aspheric shape, may be used, and a toric surface with a curvature in the longitudinal direction of the discharge tube may be used.

Moreover, the explanation in Embodiment 1 is about the case where the configuration of each surface on the incident surface side and emergent surface side of the optical member is symmetric with respect to the irradiation optical axis L. However, the configuration of the optical member is not necessarily limited to such a symmetric configuration.

For example, the prism portions 4b, 4c, 4b' and 4c' on the incident surface side of the second optical member 4 have symmetric shapes with respect to the irradiation optical axis L. However, they do not necessarily need to be formed like this, and an aspheric shape is acceptable. This can be said not only for the prism portion, but also for the cylindrical lens surface 4a in the center portion in the second optical member 4 and the prism portion 3b in the first optical member 3.

In addition, as for the Fresnel lens portion 4e formed at the center of the longitudinal direction of the discharge tube on the emergent surface side, the angle of each Fresnel lens surface does not need to be constant, and may be gradually changed in the longitudinal direction of the discharge tube. Moreover, a Fresnel lens with different right and left angle settings may be used.

Furthermore, the explanation in Embodiment 1 is about the case where the nanocomposite material is used as an optical material with a high refractive index. However, the optical material is not limited to the optical resin material in which such ultrafine particles are mixed, and the optical member may be formed by glass molding that uses a glass material with a high refractive index.

Moreover, the first and second optical members are separated in Embodiment 1. However, they may be formed integrally of a material with a high refractive index, and thereby the simplification of assembly of the illumination unit, the facilitation of light distribution control and the reduction in costs can be attempted.

Embodiment 2

Figure 11:
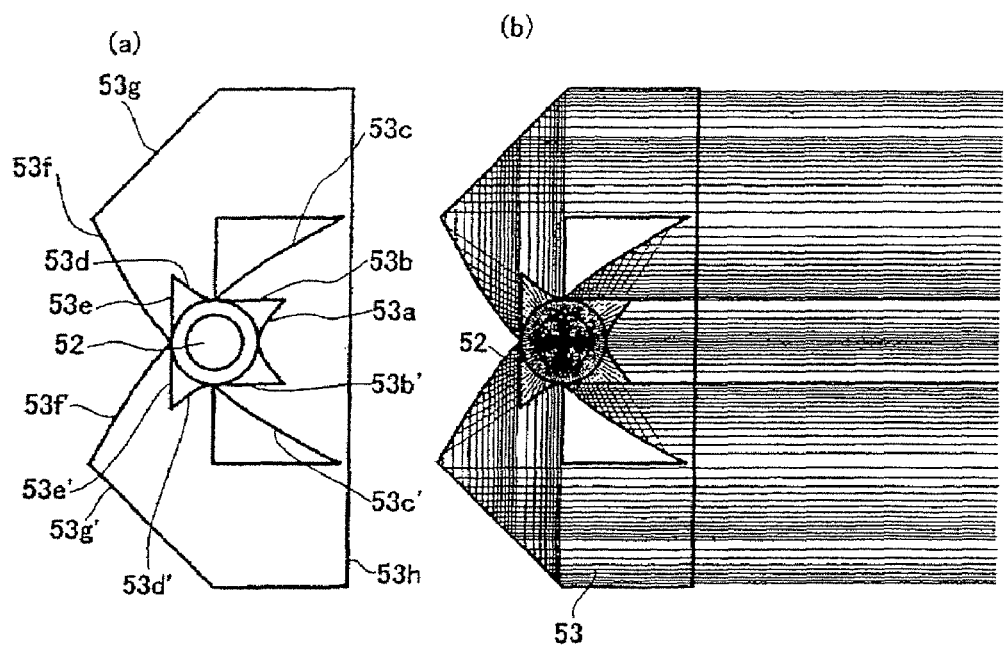
FIG. 11 is a longitudinal sectional view showing an illumination optical system in Embodiment 2 of the present invention.
Figure 12:
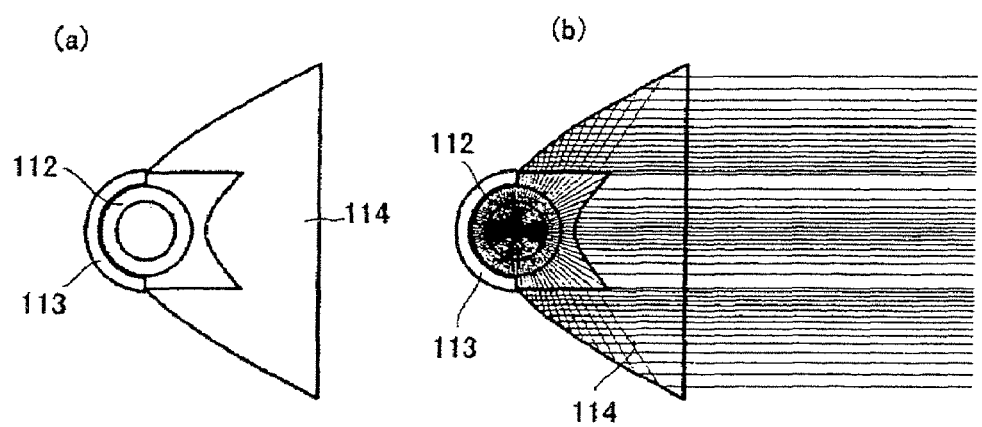
FIG. 12 is a longitudinal sectional view showing a conventional illumination optical system.

FIG. 11 shows an illumination optical system in Embodiment 2 of the present invention. FIG. 12 shows a conventional optical system that is equivalent to the optical system in Embodiment 2. Hereinafter, the shape of the optical system in Embodiment 2 will be explained while comparing it with the shape of the optical system in FIG. 12. (a) of each figure shows a section of a light-emitting discharge tube in a diameter direction of the discharge tube, and (b) of each figure shows a ray trace chart of this section.

In FIGS. 11(a) and (b), the reference numeral 52 denotes a light-emitting discharge tube as a light source, and the reference numeral 53 denotes an optical member having an converging action by total reflections.

From the viewpoint of miniaturization of the illumination optical system, Returning a luminous flux that emitted backward from the center of the light source (discharge tube 52) to the center thereof, and handling it just like a luminous flux that emitted forward directly from the light source as shown in FIG. 12(b) can reduce the size of the optical system to the minimum, and it is effective to the optical apparatus such as a camera that values the portability.

However, as for the illumination optical system, such a miniaturization alone is not prioritized, it is also important that the illumination optical system can illuminate efficiently for a given energy. This embodiment is an illumination optical system that prioritizes the efficiency.

It is possible to irradiate the luminous flux most efficiently toward an object for a given energy by using total reflections in the optical member to lead the luminous flux. The present embodiment shows an illumination optical system characterized in that it maximizes the use of total reflections, and especially, it leads the luminous flux that emitted backward from the light source forward by using another optical path including total reflections. In other words, the illumination optical system reflects the luminous flux that emitted backward from the light source to the light irradiation side directly without returning it to the light source.

Therefore, although the area of the emergent surface increases, it is possible to achieve an efficient illumination optical system in which the loss of light amount by surface reflections caused when the luminous flux that reflected on the reflector 113 passes the light source again is small and the luminous flux is not affected adversely by the refraction by the glass tube.

As shown in FIG. 11(b), in the optical member 53 of the present embodiment, the luminous flux that emitted forward directly traces an optical path that is similar to that of the luminous flux shown in FIG. 12(b), and emerges from an emergent surface 53b. The shape of each portion in the optical path and the behavior of the rays at each portion are similar to these in Embodiment 1.

On the other hand, the luminous flux that emitted backward from the light source receives refraction actions from incident surfaces 53b and 53b' or incident surfaces 53e and 53e', and then is totally reflected by first prism surfaces (reflective surfaces) 53f and 53f' that constitute each of pairs of prism portions. Thereby, the luminous flux is arranged in a direction forming an angle of 90 degrees to the irradiation optical axis once, and then is totally reflected by second prism surfaces (reflective surfaces) 53g and 53g' again. As a result, the luminous flux progresses in a direction parallel to the irradiation optical axis, and then emerges from an emergent surface 53h.

In the embodiment, as a method for leading a luminous flux that emitted toward an opposite direction of the irradiation direction efficiently by the total reflection actions of the optical member 53, the structure is adopted, in which the luminous flux traces an optical path different from an optical path passing the center of the light source, and then emerges from a range in the emergent surface different from a range from which a luminous flux that emitted toward the irradiation direction directly emerges, as Embodiment 1.

In the embodiment, it is possible to form the optical member having excellent optical characteristics though the shape thereof becomes large. And, the embodiment can be applied to an illumination optical system in which efficiency is the top priority. In addition, it is possible to form the optical member integrally though the shape is complex, and the optical member will have stable optical characteristics.

Embodiment 3

Figure 13:
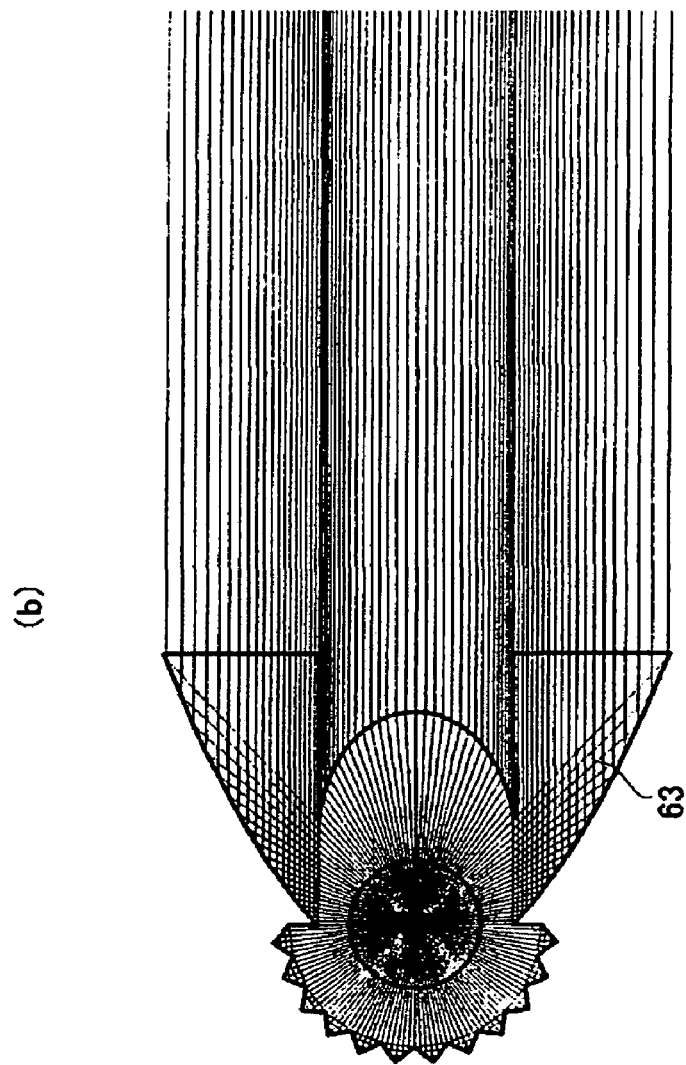
FIG. 13 is a longitudinal sectional view showing an illumination optical system in Embodiment 3 of the present invention.
Figure 13:
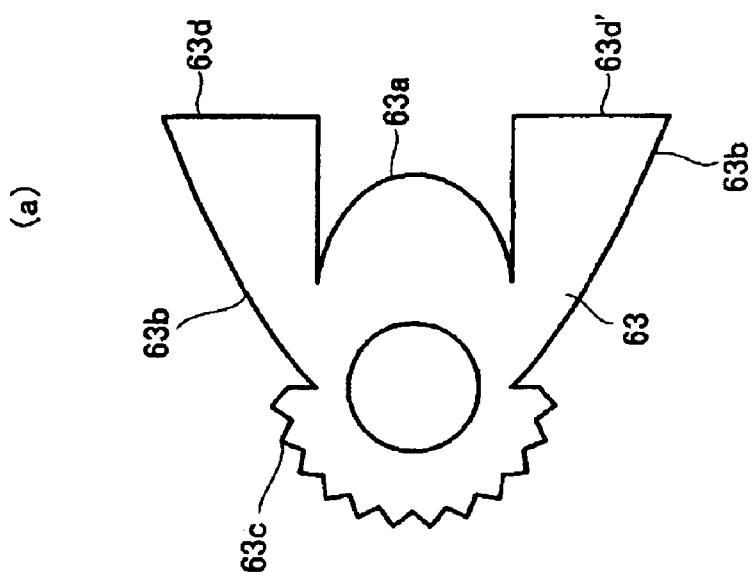

FIG. 13 shows an illumination optical system in Embodiment 3 of the present invention. In the embodiment, an optical member (hereinafter, it is referred to as a light-emitting discharge member) is formed integrally with a light-emitting discharge tube. In other words, Xenon (Xe) gas is encapsulated in a cylinder portion formed at the center of the optical member, and a converging action is given by optimizing the shape of a glass portion that covers the outside of the cylinder portion.

FIG. 13(a) is a cross section of a diameter direction of the light-emitting discharge member, and FIG. 13(b) shows a ray trace chart in this cross section.

The reference numeral 63 denotes the light-emitting discharge member, it being constituted by the following portions. At First, a cylindrical lens portion 63a having a strong refractive power is formed at the center of an emergent surface side, and strongly converges a luminous flux component with a small inclination to the irradiation optical axis by the lens power. Moreover, a luminous flux component with a somewhat large inclination to the irradiation optical axis is totally reflected by reflective surfaces 63b and 63b' having a substantially paraboloidal surface shape, is converted into a component parallel to the irradiation optical axis, and emerges from emergent surfaces 63d and 63d' that are different from the lens portion 63a.

On the other hand, the luminous flux that emitted backward from the light source, which is on the opposite side to the irradiation direction, is totally reflected twice at a plurality of prism portions 63c arranged behind the light source, and then passes through the vicinity of the center of the light source to emerge forward. It is preferable that the pitch interval of the prism portions 63c is 15 degrees, and the shape of two prism surfaces constituting each prism portion 63c is a paraboloidal shape as explained in Embodiment 1.

For effective functions of the above-mentioned optical system as an illumination optical system, it is preferable that the refractive index of the optical member 63 is high to minimize a luminous flux component that emitted backward and emerges out of the optical member 63.

Thus, extremely miniaturizing the illumination optical system becomes possible by integrating the light-emitting discharge tube and the optical member. Moreover, because the distance from the center of the light source to prism portions arranged behind the light source can be reduced, unnecessary refractions and the surface reflections at the time of incidence or emergence can be minimized.

As a structure for obtaining equivalent effects, a cylindrical surface may be arranged behind the light source and deposit a metallic reflective surface with a high reflectivity to the cylindrical surface.

However, it is not practical because a thermal energy by emissions is so larger than expected that the deposited material whose thermal capacity is small might be removed by several emissions, and optical characteristics might be remarkably deteriorated.

In the present embodiment, since the reflective surface is not formed by an added film such as a deposited metallic film, the characteristics of the illumination optical system is not deteriorated even if emissions are repeated, and an optical system with excellent durability can be achieved. Furthermore, since the light source and optical acting portions are formed integrally, it is possible to obtain excellent optical characteristics semipermanently, which cannot be obtained by combining two or more members, by optimizing molding conditions once and maintaining it stably.

Embodiment 4

Figure 14:
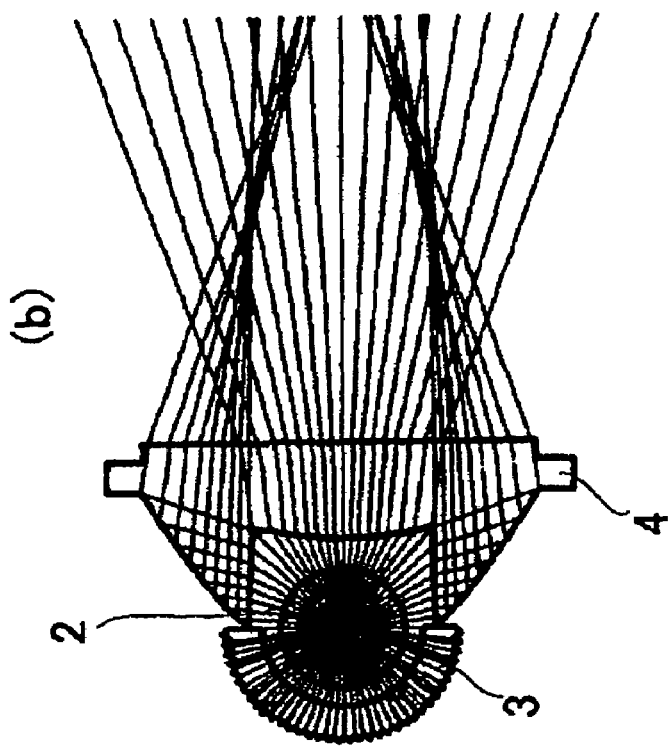
FIG. 14 is a longitudinal sectional view showing an illumination optical system in Embodiment 4 of the present invention.
Figure 14:
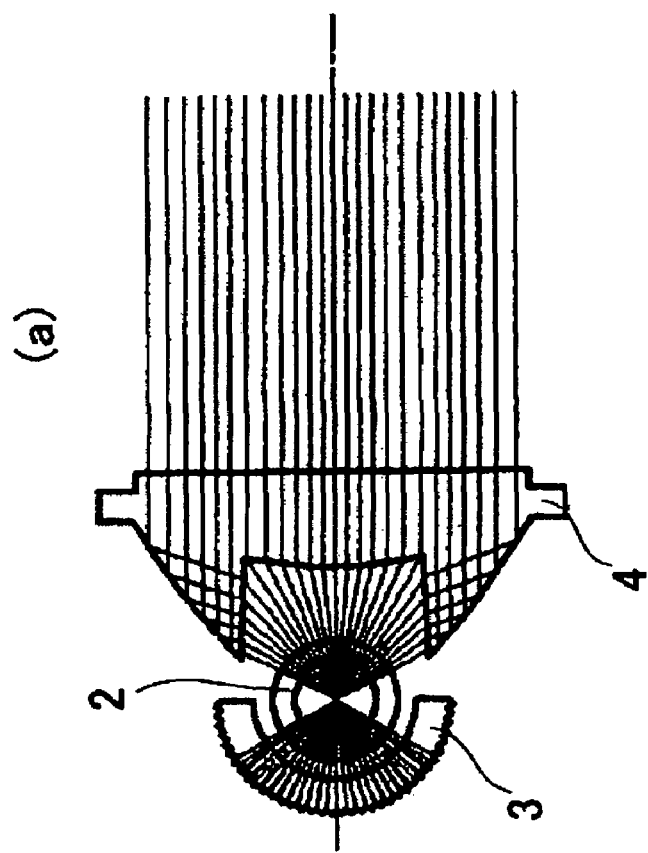

FIG. 14 shows an illumination optical system in Embodiment 4 of the present invention, and a ray trace chart thereof. This embodiment corresponds to an illumination optical system that a zoom function is added to the illumination optical system of Embodiment 1.

FIG. 14(a) shows a telephoto irradiation state in which the distance from the light-emitting discharge tube 2 and first optical member 3 to the second optical member 4 is large, an irradiation range of a luminous flux being narrow. FIG. 14(b) shows a wide-angle irradiation state in which the distance from the light-emitting discharge tube 2 and first optical member 3 to the second optical member 4 is small, the irradiation range of the luminous flux being wide.

In this embodiment, irradiation ranges (angles) corresponding to angles of field of the image-taking lens are automatically obtained by driving the second optical member 4 in the direction of the irradiation optical axis by interlocking with zoom operations of the image-taking lens barrel 12 via a synchronization mechanism, not shown in the figure, in the camera shown in FIG. 5.

Thus, even when the first optical member 3 is arranged behind the light source, the irradiation range can be changed as well as a conventional illumination optical system with a reflector.

The effects of the above-mentioned embodiments are described as follows.

1. It becomes possible to lead the luminous flux that emitted backward from the light source forward by total reflections, and thereby it becomes possible to attempt a great efficiency improvement as compared with the case with a reflector. In other words, an illumination optical system with high use efficiency of light can be achieved as compared with the case with the reflector.

Moreover, it is possible to use the light that emitted backward from the light source to illuminate the irradiation plane while avoiding enlarging the illumination optical system by forming a first reflective surface that reflects light from the refractive surface and a second reflective surface that reflects the light reflected at the first reflective surface to the irradiation side in the optical member, and by forming a plurality of reflective portions each constituted by a first and second reflective surfaces in the optical member.

2. Since converging light is performed by optical members constituted of a transparent material, and these members can be integrated, the simplification of assembly, the facilitation of light distribution control and the reduction in costs can be attempted.

3. Since all the reflective portions can be total reflection surfaces, expands the possibility of designs greatly, and thereby a delicate light distribution control can be performed.

4. Although the conventional reflector made of a metallic material has adverse affects on the optical system such as deformations of members caused by external forces, the optical members in the above-mentioned embodiments can obtain steady shapes with little variations if the molding conditions are fixed.

In a case where the light source is a cylindrical discharge tube, since the influence of refraction at the discharge tube can be reduced by the above-mentioned refractive surface having a semi-cylindrical shape concentric with the discharge tube, the design of the reflective surface and the control of light can be facilitated.

5. The compatibility with resin materials having high refractive indexes, such as a nanocomposite material that the practical use thereof is expected in the future, is good, and an improvement of optical characteristics can be easily attempted.

Here, the optical member can have a higher refractive index, as compared with an optical member formed only of a base resin material, by forming the optical member of a particle-containing material containing particles whose size are smaller than 1 μm (or the wavelength of the visible light, or 100 nm) in the base resin material. Since the light from the light source is not diffused by the particles, and the transmittance of the optical member is not reduced by the particles. Therefore, It is possible to miniaturize the illumination optical system without deteriorating optical characteristics (while securing a necessary irradiation characteristics).

In addition, in a case where a reflective surface having a total reflection action is formed in the optical member, since total reflections becomes easy to occur when the refractive index is higher (the critical angle becomes small), the loss of light amount by transmitting through the reflective surface is reduced, and thereby an optical system with higher efficiency can be achieved.

A bright illuminating can be performed while corresponding to the demand of the miniaturization of an image-taking apparatus and illumination device by the above-mentioned effects of 1 to 5.

In addition, there are the following effects, too.

6. Since using a reflector is not needed, the possibility of electric leakages from a trigger to surrounding metallic materials decreases, and thereby an electrically steady structure can be adopted.

7. Since a metallic reflector is not used, conductive regions to which a high voltage is applied decrease. Therefore, processes for preventing electric shocks become unnecessary; the reduction in costs can be attempted. Moreover, waterproof measures become easy, and the possibility of designs expands greatly.

This application claims priority from Japanese Patent Application No. 2004-016374 filed on Jan. 23, 2004, which is hereby incorporated by reference herein.

What is claimed is:

1. An illumination optical system comprising:
   a light source; and
   a first optical member arranged on an opposite side to a light irradiation side of the optical system with respect to the light source,
   wherein the first optical member includes a refractive surface through which light from the light source is transmitted and a reflective surface which totally reflects the light from the refractive surface toward the light irradiation side, and
   wherein the first optical member includes as the reflective surface a first reflective surface which totally reflects the light from the refractive surface, and a second reflective surface which totally reflects the light from the first reflective surface toward the light irradiation side, the light reflected by the first reflective surface proceeding to the second reflective surface without emerging out from the refractive surface.

2. The illumination optical system according to claim 1, wherein
   the first optical member includes a plurality of reflective portions, each reflective portion being constituted by the first and second reflective surfaces.

3. The illumination optical system according to claim 1, wherein
   the reflective surface reflects the light incident thereon so as to return it to the light source.

4. The illumination optical system according to claim 1, wherein
   the reflective surface reflects the light incident thereon toward the light irradiation side without returning it to the light source.

5. The illumination optical system according to claim 1, further comprising:
   a second optical member arranged on the light irradiation side with respect to the light source.

6. The illumination optical system according to claim 5, wherein the first and second optical members are formed integrally.

7. The illumination optical system according to claim 1, wherein
   the first optical member is formed of a particle-containing material containing particles whose particle size is smaller than 1 μm in a resin base material.

8. The illumination optical system according to claim 7, wherein
   the particle size is smaller than a wavelength of light in visible region.

9. The illumination optical system according to claim 7, wherein
   the particle size is smaller than 100 nm.

10. The illumination optical system according to claim 1, wherein
    the light source is a cylindrical discharge tube, and the refractive surface has a semi-cylindrical shape substantially concentric with the discharge tube.

11. An image-taking apparatus comprising:
    the illumination optical system according to claim 1; and
    an image-taking system which takes an image of an object illuminated by the light from the illumination optical system.

12. An illumination device comprising:
    the illumination optical system according to claim 1.

* * * * *

UNITED STATES PATENT AND TRADEMARK OFFICE
CERTIFICATE OF CORRECTION

PATENT NO. : 7,254,323 B2
APPLICATION NO. : 11/035977
DATED : August 7, 2007
INVENTOR(S) : Yoshiharu Tenmyo It is certified that error appears in the above-identified patent and that said Letters Patent is hereby corrected as shown below:

ON THE COVER PAGE
At (57) Abstract:
Line 2, "which emitted" should read --which has emitted--.

COLUMN 1:
Line 12, "emitted" should read --emits--.
Line 13, "that" should read --in which--.
Line 15, "formed" should read --is formed--.
Line 39, "evade" should read --avoid--.
Line 41, "cross sectional" should read --cross-sectional--.

COLUMN 2:
Line 16, "cross sectional" should read --cross-sectional--.

COLUMN 4:
Line 31, "processability." should read --processabilities.--.
Line 45, "a" should be deleted.

COLUMN 5:
Line 5, "enough" should read --sufficiently--.
Line 61, "constitutes" should read --constitute--.

COLUMN 7:
Line 5, "it," should read --that--.
Line 8, "it," should read --that--.
Line 17, "First," should read --first,--.

COLUMN 8:
Line 37, "brilliance" should read --brilliant--.
Line 48, "have" should read --was--.
Line 64, "is" should read --has--.
Line 67, "can be thought" should read --desirably--.

COLUMN 9:
Line 20, "than ever." should read --advantageously.--.
Line 42, "ingenuities" should read --characteristics--.

UNITED STATES PATENT AND TRADEMARK OFFICE
CERTIFICATE OF CORRECTION

PATENT NO. : 7,254,323 B2
APPLICATION NO. : 11/035977
DATED : August 7, 2007
INVENTOR(S) : Yoshiharu Tenmyo It is certified that error appears in the above-identified patent and that said Letters Patent is hereby corrected as shown below:

COLUMN 11:
Line 21, "includes" should read --include--.

COLUMN 15:
Line 41, "First," should read --first,--.

COLUMN 17:
Line 37, "and" should be deleted.
Line 39, "It" should read --it--.
Line 41, "a" should be deleted.
Line 45, "reflections" should read --reflection--.

Signed and Sealed this

Twenty-seventh Day of January, 2009

JOHN DOLL
*Acting Director of the United States Patent and Trademark Office*